United States Patent
Cheucle

(10) Patent No.: US 10,000,597 B2
(45) Date of Patent: Jun. 19, 2018

(54) WATER-SOLUBLE HYDROXYALKYL POLYMER OBTAINED BY A METHOD OF INVERSE SUSPENSION OR INVERSE EMULSION POLYMERISATION

(71) Applicant: S.P.C.M. SA, Andrezieux Boutheon (FR)

(72) Inventor: Pierrick Cheucle, Saint Romain le Puy (FR)

(73) Assignee: S.P.C.M. SA, Andrezieux Boutheon (FR)

( * ) Notice: Subject to any disclaimer, the term of this patent is extended or adjusted under 35 U.S.C. 154(b) by 0 days. days.

(21) Appl. No.: 15/326,603

(22) PCT Filed: Jul. 24, 2015

(86) PCT No.: PCT/FR2015/052055
§ 371 (c)(1),
(2) Date: Jan. 16, 2017

(87) PCT Pub. No.: WO2016/020599
PCT Pub. Date: Feb. 11, 2016

(65) Prior Publication Data
US 2017/0204210 A1 Jul. 20, 2017

(30) Foreign Application Priority Data
Aug. 8, 2014 (FR) ..................... 14 57725

(51) Int. Cl.
*C08F 220/06* (2006.01)
*C08F 220/26* (2006.01)
*C08F 2/32* (2006.01)
*C08F 2/38* (2006.01)
*C09K 8/035* (2006.01)
*D21H 19/10* (2006.01)

(52) U.S. Cl.
CPC .............. *C08F 220/06* (2013.01); *C08F 2/32* (2013.01); *C08F 2/38* (2013.01); *C09K 8/035* (2013.01); *D21H 19/10* (2013.01)

(58) Field of Classification Search
CPC .......... C08F 20/06; C08F 20/28; C08F 20/32; C08F 220/06; C08F 220/26; C08F 220/281; C08F 220/325; C08F 2/18; C08F 2/22; C08F 2/38; C08F 6/12
USPC ......................................... 526/317.1, 318.42
See application file for complete search history.

(56) References Cited

U.S. PATENT DOCUMENTS

| 4,461,774 A | 7/1984 | Saji et al. |
| 9,663,704 B2 * | 5/2017 | Favero ................ C09K 8/588 |
| 2004/0024156 A1 * | 2/2004 | Quadir .................. C01F 7/47 526/303.1 |
| 2014/0326457 A1 | 11/2014 | Favero |

FOREIGN PATENT DOCUMENTS

FR 2986033 A1 7/2013
JP S56161413 A 12/1981

OTHER PUBLICATIONS

Machine-Generated English-Language Translation of JP S56-161413 A.*
International Search Report and Written Opinion issued in PCT/FR2015/052055, dated Nov. 12, 2015.
Database WPI, Week 198204, Thomson Scientific, London, GB; AN 1982-06772E XP002736386, & JP S56161413A, Dec. 11, 1981.
Zhang, Y., et al., "Preparation and Super-Water-Absorbency of Poly(sodium acrylate-co-acrylamide-co-2-hydroxyethyl acrylate", Polymer(Korea), vol. 30, No. 4, pp. 286-290 (2006).

* cited by examiner

*Primary Examiner* — Vu A Nguyen
(74) *Attorney, Agent, or Firm* — Heslin Rothenberg Farley & Mesiti P.C.

(57) ABSTRACT

This invention relates to a water-soluble polymer in bead or powder form, characterized in that it has a Brookfield viscosity greater than 100 cps, and in that it is obtained by inverse suspension or inverse emulsion polymerization, in the presence of a transfer agent, of monomers where less than 20 mol % is made up of a hydroxyalkyl monomer with formula $H_2C=CR^1R^2$, $R^1$ being a hydrogen atom or a methyl group and $R^2$ being a hydrocarbon group containing at least one OH pendant group or at least one epoxide group and optionally at least one N or O heteroatom in the hydrocarbon chains; $R^2$ being different from the $C(=O)$—OH group.

20 Claims, No Drawings

WATER-SOLUBLE HYDROXYALKYL POLYMER OBTAINED BY A METHOD OF INVERSE SUSPENSION OR INVERSE EMULSION POLYMERISATION

CROSS REFERENCE TO RELATED APPLICATIONS

This application is a national stage filing under section 371 of International Application No. PCT/FR2015/052055, filed on Jul. 24, 2015, and published on Feb. 11, 2016 as WO 2016/020599, which claims priority to French Application No. 1457725, filed on Aug. 8, 2014. The entire contents of each of said applications are hereby incorporated herein by reference.

This invention relates to water-soluble hydroxyalkyl polymers with high molecular weights obtained using a method of inverse suspension or inverse emulsion polymerization. The invention also relates to the use of these polymers in the fields of oil drilling, gas and oil extraction, paper manufacturing, water treatment, or agriculture.

Incorporating hydroxyl functions in a water-soluble polymer, in particular with an acrylate or acrylamide base, contributes interesting properties for certain industrial sectors. Examples include clay inhibitors in the oil drilling field, cation precipitation prevention agents, in particular in saline waters used in gas and oil extraction operations, or surface agents on paper coatings.

Unfortunately, incorporating hydroxyl functions poses many difficulties, particularly if one wishes to obtain high molecular weights. Indeed, the hydroxyl functions may generate transfer phenomena and therefore ultimately create cross-linking problems. For example, the carboxyl function present in the acrylic acid may lead to unwanted esterification reactions. This esterification, whether it occurs during or after polymerization, causes the formation of an insoluble product that is therefore unsuitable for its use.

Polymers in powder or bead form are increasingly sought out and desired on an industrial level, since they are easy to transport and have a very high concentration of active material. Furthermore, they have a much longer lifetime relative to polymers in liquid or emulsion form, and have the advantage of not needing to contain additional protective agents such as biocides.

However, it is impossible to obtain water-soluble and hydroxyalkyl polymers using the traditional powder method, since they are either systematically cross-linked, or have an excessively low molecular weight to be worked during later steps of the method (gel that is too soft and sticky).

Document JP-1981-161413 describes a synthesis method by inverse suspension of nonlinear polymers containing hydroxyalkyl monomers. The cross-linking effect of the alcohol functions is exploited therein to thus obtain auto-cross-linking and therefore a water-swellable polymer.

Today, it is the liquid form that makes it possible to obtain a technically acceptable product, but having a low molecular weight, in the easiest way. The polymer solutions also have the drawback of having a very low content level of active material (less than 10% by weight) and consequently having transport and storage constraints for the user. Furthermore, liquids are frequently subject to contamination problems, and more generally stability problems over time. Their lifetime is therefore limited.

Granted, liquid drying methods (for example on a drying drum) make it possible to obtain a solid form from a liquid polymer solution, but the obtained polymers have a low molecular weight.

The techniques of the prior art do not make it possible to obtain a hydro-alkyl polymer in bead or powder form that is both water-soluble and has a high molecular weight.

The problem that the invention proposes to resolve is therefore to provide a hydroalkyl polymer in powder or bead form, with a high molecular weight and that is water-soluble.

Quite surprisingly, the Applicant has discovered that using the polymerization technique by inverse suspension (called bead polymerization) or polymerization by inverse emulsion combined with a low percentage of hydroalkyl monomer made it possible to obtain a hydroalkyl polymer in bead or powder form, with a high molecular weight and that is water-soluble.

The molecular weight of the polymers may be characterized in different ways. The Applicant has chosen to express the molecular weight using the direct viscosity of a solution of the polymer at a concentration of 5% by mass in deionized water (distilled water). This measurement is done at 25° C. with a conventional Brookfield viscometer, at a speed of 30 revolutions per minute. In the rest of the description, this viscosity is called Brookfield viscosity. The water-soluble polymer being essentially linear, the Brookfield viscosity is proportional to the molecular weight of the polymer.

In this application, a polymer is considered to be water-soluble when it has a rate of insolubles in the water below 1%, measured using the following method. 1 g of polymer is added to 200 ml of deionized water while stirring, said stirring being maintained for 4 hours, all at 25° C. The mixture is then filtered on a filter with a pore size equal to 200 micrometers. The filter having collected the insoluble particles is placed in a heat chamber at 105° C. for 4 hours. The insoluble percentage is determined by the ratio between the polymer mass collected in the filter after drying, and the polymer mass initially added, i.e. 1 g. By default, if the filter is clogged by insoluble particles that have swelled and make it impossible to filter the solution, the insoluble level is considered to be greater than 2%.

More specifically, this invention relates to a water-soluble polymer in bead or powder form with a Brookfield viscosity greater than 100 cps. This polymer is obtained by inverse suspension or inverse emulsion polymerization, in the presence of a transfer agent, of monomers comprising an ethylene function ($CH_2=C-$) whereof less than 20 mol % is made up of at least one hydroalkyl monomer with formula $H_2C=CR^1R^2$, the 100 mol % addition being made up of non-ionic and/or anionic and/or cationic monomers different from said hydroalkyl monomer. In the formula $H_2C=CR^1R^2$, $R^1$ is a hydrogen atom or a methyl group and $R^2$ is a hydrocarbon group containing at least one OH pendant group or at least one epoxide group, and optionally at least one N or O heteroatom in the hydrocarbon chain; $R^2$ being different from the $C(=O)-OH$ group.

According to one particular embodiment, the $R^2$ group is a C1-C7 hydrocarbon group containing at least an OH pendant group, an N heteroatom, and an O heteroatom in the hydrocarbon chain.

According to another particular embodiment, the $R^2$ group is a C1-C7 hydrocarbon group containing at least an OH pendant group and two O heteroatoms in the hydrocarbon chain.

According to one particular embodiment, the $R^2$ group may comprise at least one epoxide group. The hydroalkyl monomer can then be chosen from the group comprising glycidyl acrylate; glycidyl methacrylate; and glycidyl allyl ether.

The water-soluble polymer of the invention is essentially linear. It may have potential branches/cross-links resulting from the presence of OH functions of the hydroxyalkyl monomer.

Inverse suspension polymerization is also called bead polymerization because it makes it possible to obtain spherical particles in the shape of a bead. It consists of polymerizing an aqueous phase of water-soluble monomers dispersed in droplet form in a hydrophobic phase in the presence of at least one stabilizing surfactant. The monomers present in the droplets polymerize owing to initiators to obtain "set" droplets made up primarily of water and polymer. One or several water and solvent extraction steps make it possible to isolate the polymer in bead form.

Water-in-oil inverse emulsion polymerization consists of polymerizing an aqueous phase of water-soluble monomers emulsified in droplet form in a hydrophobic phase in the presence of at least one stabilizing surfactant. The monomers present in the droplets polymerize owing to initiators to obtain microdroplets made up primarily of water and polymer. One or several water and solvent extraction steps make it possible to isolate the polymer in powder form.

Inverse suspension polymerization differs from inverse emulsion polymerization in particular due to the size of the polymer particles obtained. While inverse suspension makes it possible to obtain particles of at least 20 micrometers, inverse emulsion may only reach 5 micrometers. The size of the polymer particles is related to the size of the droplets formed in the suspension or the emulsion. Each aqueous phase droplet corresponds to a reactor or micro-reactor in which the monomers are polymerized.

A person skilled in the art is perfectly capable of distinguishing between inverse suspension polymerization and inverse emulsion polymerization.

As previously indicated, the water-soluble polymer of the invention can be obtained either by inverse suspension polymerization or by inverse emulsion polymerization. It is preferably obtained by inverse suspension polymerization.

The water-soluble and hydroxyalkyl polymer particles obtained at the end of the inverse suspension polymerization (after the extraction step) are in bead form. The size of these particles is advantageously between 20 and 1000 micrometers, more preferably between 50 µm and 100 µm, and even more preferably between 100 µm and 700 µm.

The water-soluble and hydroxyalkyl polymer particles obtained at the end of the inverse emulsion polymerization (after the extraction step) are in powder form. The size of these particles is advantageously between 0.01 µm and 5 µm, more preferably between 0.1 µm and 3 µm, and even more preferably between 0.5 µm and 1.5 µm.

The particle size (bead or powder) refers to the mean diameter measured with a laser granulometer using the conventional techniques that are part of the general knowledge of a person skilled in the art. One example apparatus for measuring particle size is the Mastersizer Scirocco 2000 marketed by Malvern Instruments. However, particle size can be measured with any type of appropriate traditional apparatus. A person skilled in the art has the necessary knowledge to select the appropriate apparatus.

The water-soluble and hydroxyalkyl polymer of the invention has a Brookfield viscosity preferably greater than 200 cps (centipoise, 1 cps=1 mPa·s), more preferably greater than 1000 cps, even more preferably greater than 2000 cps, even more preferably greater than 5000 cps and even more preferably greater than 10,000 cps.

The molecular weight of the water-soluble and hydroxyalkyl polymer of the invention is advantageously greater than 500,000 g/mol, preferably greater than 1 million g/mol.

When the $R^2$ hydrocarbon group contains between 1 and 3 carbon atoms, the water-soluble and hydroxyalkyl polymer of the invention should preferably contain less than 17 mol % of hydroxyalkyl monomer, and even more preferably less than 15 mol %. It should preferably contain at least 8 mol % of hydroxyalkyl monomer, and even more preferably more than 10 mol %.

When the $R^2$ hydrocarbon group contains more than 3 carbon atoms, the water-soluble and hydroxyalkyl polymer of the invention should preferably contain less than 5 mol % of hydroxyalkyl monomer, and even more preferably less than 2.5 mol %. It should preferably contain at least 0.2 mol % of hydroxyalkyl monomer, and even more preferably more than 0.4 mol %.

As previously indicated, the inverse suspension or inverse emulsion polymerization is done in the presence of a transfer agent. As an example, the transfer agent may in particular be chosen from the group comprising methanol, isopropanol, sodium hypophosphite, 2-mercaptoethanol, aminoethanethiol, cysteine, methallyl sulfonic acid, thioglycolic acid, thiolactic acid, glycolic acid, 3-mercaptopropionic acid, the alkaline earth salts of these acids, and the mixtures of these compounds.

The quantity of transfer agent is advantageously between 1 and 5000 ppm, preferably between 50 and 2000 ppm relative to the weight of the monomers of the water-soluble and hydroxyalkyl polymer, and even more preferably between 100 and 1500 ppm.

As previously indicated, the water-soluble and hydroxyalkyl polymer according to the invention comprises less than 20 mol % of at least one hydroxyalkyl monomer with formula $H_2C=CR^1 R^2$. This monomer, when it comprises at least one OH pendant group, can in particular be chosen from the group comprising hydroxyalkyl acrylate; hydroxyalkyl methacrylate; hydroxyalkyl acrylamide; hydroxyalkyl methacrylamide; 2,3-dihydroxypropyl methacrylate; amino alcohol acrylate, for example N-[tris(hydroxymethyl)aminomethane] acrylamide; amino alcohol methacrylate, for example N-[tris(hydroxymethyl)aminomethane] methacrylamide; alkyl designating a linear alkyl group comprising 1 to 6 carbon atoms, and preferably 2 to 4 carbon atoms.

The hydroxyalkyl meth(acrylate) and/or hydroxyalkyl (meth)acrylamide monomers are preferably chosen from among hydroxymethyl (meth)acrylamide, hydroxyethyl (meth)acrylate, hydroxypropyl (meth)acrylate, hydroxybutyl (meth)acrylate, hydroxymethyl (meth)acrylate, hydroxyethyl (meth)acrylamide, hydroxypropyl (meth)acrylamide, and hydroxybutyl (meth)acrylamide.

The polymer of the invention is obtained by copolymerizing less than 20 mol % of at least one hydroxyalkyl monomer with more than 80 mol % of at least one other monomer. The other monomers, which are advantageously water-soluble, that can be implemented may in particular be chosen from among the following monomers:

anionic monomer, preferably chosen from among acrylic acid, methacrylic acid, itaconic acid, maleic acid, 2-acrylamido-2-methylpropane sulfonic acid (ATBS), said monomers being in acid form, partially salified or totally salified;

non-ionic monomer, preferably chosen from among acrylamide, methacrylamide, N,N'-dimethlacrylamide, N-vinyl pyrrolidone, N-vinyl formamide, polyethylene glycol methacrylates, diacetoneacrylamide and N-isopropylacrylamide.

The co-monomers are preferably acrylic acid and/or acrylamide, and preferably represent at least 50 mol %, more preferably at least 70 mol % of the monomers of the polymer of the invention.

Water-soluble cationic monomers can also be copolymerized. In this case, they are preferably used at less than 10 mol %. In one preferred embodiment of the invention, the polymer does not contain cationic functions.

Monomers with hydrophobic natures may also be copolymerized. In this case, they are preferably used at less than 1 mol %.

The inverse suspension polymerization method comprises the following successive steps:
  a) Preparing an inverse suspension by mixing an aqueous phase comprising at least the monomers and a transfer agent and a non-aqueous phase comprising at least a non-aqueous solvent and at least one surfactant;
  b) Inverse suspension polymerization of the monomers in the presence of a free radical initiator;
  c) Extracting water and solvent from the suspension in order to obtain the water-soluble and hydroxyalkyl polymer in bead form.

The weight ratio between the aqueous phase and the non-water-soluble organic solvent is generally between 1:2 and 8:1, and preferably between 1:2 and 2:1.

As previously mentioned, the particles obtained at the end of this inverse suspension polymerization method are spherical, and take on the form of beads.

The non-aqueous phase comprises a non-water-soluble solvent and at least one surfactant that stabilizes the suspension while making it possible to keep the aqueous phase droplets in suspension in the non-aqueous phase. Advantageously, the non-aqueous phase is a phase made up of a non-aqueous solvent preferably chosen from among a mineral oil, in particular commercial, containing saturated paraffin, isoparaffin, cycloparaffin, or naphthalic hydrocarbons, or a mixture of several of these oils. This mineral oil advantageously, and at ambient temperature (22° C.), has a density between 0.7 and 0.9.

Advantageously, the solvent makes it possible to solubilize the surfactant.

The stabilizing agents can be chosen from among sodium dodecyl ether sulfate, chlorinated trimethyl stearyl ammonium, carboxymethyl cetyl ammonium, sucrose, sorbitan esters such as sorbitan monostearate, sucrose dilaurate, and from among surfactants with a high molecular weight, which are preferably soluble and dispersible in the continuous phase. These compounds include methyl cellulose ethers, hydroxypropyl methyl cellulose ethers, ethyl cellulose ethers, ethyl hydroxyethyl cellulose, methyl hydroxymethyl cellulose, starches, partially saponified polyvinyle acetates, saponified ethylene/vinyl acetate copolymers, poly (meth)acrylic acid alkaline metal salts, styrene and vinyl acetate copolymers, (meth)acrylate copolymers with (meth) acrylic acids or their salts, polyethylene imines, polyvinylic alcohols, polyalkyl (meth)acrylates, for which the alkyl group is a linear hydrocarbon chain with 12-18 carbon atoms, with the (meth)acrylic acids or their salts. These agents can be combined.

Advantageously, the surfactant implemented is an amphiphilic polymer with an HLB of less than 7.

The polymerization reaction in step b) is primed by the introduction into the suspension formed in step a) of a free radical initiator. Examples of a free radical initiator agent include oxidizer-reducer pairs with, among the oxidizers, cumene hydroperoxide or tertiary butyl hydroxy peroxide, and among the reactors, persulfates such as sodium metal bisulfite and Mohr salt. Azoic compounds such as 2.2'-azobis(isobutyronitrile) and 2.2'-azobis(2-amidinopropane) chlorhydrate can also be used.

Step c) for extracting water and solvent from the suspension in order to obtain the polymer in bead form is carried out in one or several steps. Different extraction techniques can be used, for example azeotropic distillation, drying with hot air, filtration, and centrifugation. The extraction step of the suspension preferably comprises two steps, one of which is a water and solvent elimination step using azeotropic distillation under reduced pressure, and the other of which is a solid/liquid separating step, for example by filtration or centrifugation, making it possible to separate the beads from the non-aqueous medium.

The azeotropic distillation is preferably done at a pressure between 20 and 500 mbars, and even more preferably between 50 and 200 mbars.

The inverse emulsion polymerization method comprises the following successive steps:
  a) Preparing an inverse emulsion by mixing an aqueous phase comprising at least the monomers and a transfer agent and a non-aqueous phase comprising at least a non-aqueous solvent and at least one emulsifying agent;
  b) Inverse emulsion polymerization of the monomers in the presence of a free radical initiator;
  c) Extracting water and solvent from the emulsion in order to obtain the water-soluble and hydroxyalkyl polymer in powder form.

The weight ratio between the aqueous phase and the non-water-soluble organic solvent is generally between 1:2 and 8:1, and preferably between 1:2 and 2:1.

As previously mentioned, the particles obtained at the end of this method are essentially non-spherical, and assume the form of a powder.

The non-aqueous phase comprises a non-water-soluble solvent and at least one emulsifying agent that stabilizes the emulsion while making it possible to keep the aqueous phase droplets in emulsion in the non-aqueous phase. Advantageously, the non-aqueous phase is a phase made up of a non-aqueous solvent preferably chosen from among a mineral oil, in particular commercial, containing saturated paraffin, isoparaffin, cycloparaffin, or naphthalic hydrocarbons, or a mixture of several of these oils. This oil advantageously, and at ambient temperature (22° C.), has a density between 0.7 and 0.9.

The solvent makes it possible to solubilize the emulsifying agent.

The emulsifying agent may be chosen from among the water-in-oil (W/O) emulsifying agents, referring to an emulsifying agent having a low enough HLB value to provide water-in-oil emulsions, and in particular an HLB value below 10.

Examples of such water-in-oil emulsifying agents include surfactant polymers such as polyesters with a molecular weight between 1000 and 3000, produced by the condensation between a succinic poly(isobutenyl) acid or its anhydride and a polyethylene glycol, block copolymers with a molecular weight between 2500 and 3500, for example those marketed under the names HYPERMER®, sorbitan extracts, such as sorbitan monooleate, sorbitan isostearate or sorbitan sesquioleate, certain polyethoxylated sorbitan esters, such as pentaethoxyl sorbitan monooleate or pentaethoxyl sorbitan isostearate, or diethoxyl oleocetylic alcohol, tetraethoxyl lauryl acrylate. These agents can be combined.

The polymerization reaction in step b) is primed by the introduction into the emulsion formed in step a) of a free radical initiator. Examples of a free radical initiator agent include oxidizer-reducer pairs with, among the oxidizers, cumene hydroperoxide or tertiary butyl hydroxy peroxide, and among the reactors, persulfates such as sodium metal bisulfite and Mohr salt. Azoic compounds such as 2,2'-azobis(isobutyronitrile) and 2,2'-azobis(2-amidinopropane) chlorhydrate can also be used.

Step c) for extracting water and solvent from the emulsion in order to obtain the polymer in powder form is carried out in one or several steps. There are in particular many methods for obtaining powder from inverse emulsions of polymers that consist of isolating the active matter from the other components of the emulsion, for example:

- precipitation in a non-solid medium such as acetone, methanol or any other polar solvent in which the polymer is not soluble. Simple filtration then makes it possible to isolate the polymer particle.
- azeotropic distillation in the presence of a binding agent and a stabilizing polymer makes it possible to lead to binders that are easily isolated by filtration before drying the particle.
- spray-drying consists of creating a cloud of fine droplets of emulsions in a hot air stream, for a controlled duration. In this case, the water and solvent extraction step comprises a step for eliminating the water and solvent by spray-drying.

One particularly suitable method for obtaining the polymers of the invention is spray-drying.

The invention also relates to the use of the polymers of the invention in the fields of oil drilling, gas recovery (or extraction), oil recovery (or extraction), paper manufacturing, water treatment, or agriculture.

The invention and its advantages can be seen in the following examples and are not exhaustive.

EXAMPLE EMBODIMENT(S) OF THE INVENTION

Firstly, a hydroxypropyl acrylate (HPA) (3 mol %)/sodium acrylate (AA.Na) (97 mol %) copolymer is synthesized using different polymerization methods and using the inverse suspension method. The quantities in ppm below are expressed by weight relative to the weight of the monomers.

Counter-Example 1 (CE-1)

Synthesis Using the Dried Liquid Method

In an agitated 1 L reactor equipped with a temperature probe and a nitrogen intake, 554 g of water and 165.6 g of glacial acrylic acid are first introduced. Neutralization is done at pH=5 by adding 92 g of an aqueous sodium hydroxide solution at 50% by mass while monitoring the exothermicity.

At the end of the neutralization, 9.2 g of hydroxypropyl acrylate, 0.15 g of sodium hypophosphite and 0.2 g of an azoic initiator are added. The reaction medium is next inerted with nitrogen. The reaction is then initiated at ambient temperature by adding a redox pair (ammonium persulfate/Mohr salt). The polymerization, which begins immediately, continues until completion, i.e., around 75° C.

The liquid is then engaged on a pilot drying drum, which, by evaporating the water, makes it possible to obtain the final powder. The polymer thus obtained, placed in solution at 5%, has a Brookfield viscosity of 210 cps and an insoluble level greater than 2%.

To limit cross-linking, the limiter dose is doubled. The Brookfield viscosity is then only 40 cps.

This shows that this technique does not make it possible to obtain a polymer in powder form and with a sufficient molecular weight without being faced at the same time with solubility problems.

Counter-Example 2 (CE-2)

Synthesis Using the Gel Method

A solution is prepared from 655.6 g of water and 231.9 g of acrylic acid partially neutralized using an aqueous solution of 128.8 g of sodium hydroxide at 50% by mass. 12.9 g of hydroxypropyl acrylate is added to the solution before cooling it to around 10° C.

The solution is placed in a Dewar, with an added 35mg of EDTA, 100 ppm of sodium hypophosphite and 800 ppm of AZDN. After inerting with nitrogen, the polymerization is initiated using a redox pair (ammonium persulfates/Mohr salt). The reaction continues until completion and until a gel with a good consistency has been obtained. This is then ground and dried so as to obtain a powder.

The polymer thus obtained, placed in solution at 5%, has a Brookfield viscosity of 5000 cps and an insoluble level greater than 2%.

Increasing the transfer agent content level and/or accelerating the reaction kinetics either by concentrating the active material or by increasing the doses of primer, never makes it possible to obtain a fully water-soluble dry product.

Example 1 (INV-1)

Synthesis Using the Inverse Suspension Method

A diluted monomer solution is prepared from 150 g of water and 217.2 g of glacial acrylic acid. The solution is neutralized using 121.6 g of sodium hydroxide at 50% concentration, then with an added 12.1 g of hydroxypropyl acrylate (HPA).

500 g of heptane and 1 g of HLB polymeric stabilizer equal to 4 before inerting with nitrogen are introduced separately into an insulated reactor provided with a temperature probe and an agitating system.

The aqueous phase then receives an added 0.25 g of thiolactic acid (transfer agent) as well as 100 ppm of metabisulfite (reducing agent), and is then placed in a dropping funnel. The content of the dropping funnel is then quickly poured into the reactor while stirring.

A lipo-soluble oxidizer is then added to initiate the polymerization. The reaction begins immediately and continues only until reaching a final temperature of 90° C. At the end of the polymerization, the water is evaporated under reduced pressure and the formed beads are lastly filtered, dried in the heating chamber and sieved.

The polymer thus obtained, placed in solution at 5%, has a Brookfield viscosity of 2000 cps and an insoluble level of 0.1%. The mean size of the particles is 250 μm.

Secondly, the quantity of hydroxypropyl acrylate (HPA) is increased from 3 mol % to 15 mol % (INV-2) and 25 mol % (CE-3). The same polymerization method from example 1 is used. The results are recorded in Table 1.

TABLE 1

Viscosity and insoluble percentage of an HPA/(AA•Na) polymer based on the method by which it is obtained.

| Example | Ratio in mol % (HPA/AA•Na) | Brookfield viscosity at 25° C. | % insolubles |
|---|---|---|---|
| INV-1 | 3/97 | 2000 cps | 0.1% |
| INV-2 | 15/85 | 2500 cps | 0.3% |
| CE-1 (liquid) | 3/97 | 210 cps | >2% |
| CE-2 (gel) | 3/97 | 5000 cps | >2% |
| CE-3 (bead) | 25/75 | 6300 cps | >2% |

(AA•Na = sodium acrylate)

The Brookfield viscosity is measured for a polymer solution at 5% by weight in deionized water. This measurement is done at 25° C. with a conventional Brookfield viscometer, at a speed of 30 revolutions per minute.

These results show the importance of having a limited quantity of hydroxypropyl acrylate monomer (<20 mol %) when the polymerization is done by inverse suspension.

The invention claimed is:

1. A water-soluble polymer in bead or powder form, wherein said polymer has a Brookfield viscosity greater than 100 cps, and is obtained by inverse suspension or inverse emulsion polymerization, in the presence of a transfer agent, of monomers comprising a $CH_2=C-$ function whereof less than 20 mol % is made up of at least one hydroalkyl monomer with formula $H_2C=CR^1R^2$, the 100 mol % addition being made up of non-ionic and/or anionic and/or cationic monomers different from said hydroalkyl monomer, $R^1$ being a hydrogen atom or a methyl group and $R^2$ being a hydrocarbon group containing at least one OH pendant group or at least one epoxide group and optionally at least one N or O heteroatom in the hydrocarbon chain; $R^2$ being different from the $C(=O)-OH$ group, wherein:

the polymer contains more than 8 mol % and less than 17 mol % of hydroxyalkyl monomer when the $R^2$ hydrocarbon group contains between 1 and 3 carbon atoms; or the polymer is obtained by inverse suspension polymerization and is in the form of a bead, the size of which is between 20 micrometers and 1000 micrometers; or the polymer is obtained by inverse emulsion polymerization and is in the form of a powder and has a particle size between 0.01 micrometers and 5 micrometers.

2. The polymer according to claim 1, wherein said polymer has a Brookfield viscosity greater than 200 cps.

3. The polymer according to claim 1, wherein the transfer agent is chosen from the group consisting of methanol, isopropanol, sodium hypophosphite, 2-mercaptoethanol, aminoethanethiol, cysteine, methallyl sulfonic acid, thioglycolic acid, thiolactic acid, glycolic acid, 3-mercaptopropionic acid, and the alkaline earth salts of these acids, and the mixtures of these compounds.

4. The polymer according to claim 1, wherein the polymer contains more than 8 mol % and less than 17 mol % of hydroxyalkyl monomer when the $R^2$ hydrocarbon group contains between 1 and 3 carbon atoms.

5. The polymer according to claim 1, wherein the polymer contains more than 0.2 mol % and less than 5 mol % of hydroxyalkyl monomer when the $R^2$ hydrocarbon group contains more than 3 carbon atoms.

6. The polymer according to claim 1, wherein the hydroxyalkyl monomer comprising at least one OH pendant group is chosen from the group consisting of hydroxyalkyl acrylate; hydroxyalkyl methacrylate; hydroxyalkyl acrylamide; hydroxyalkyl methacrylamide; methacrylamido propyldimethyl-2,3-dihydroxypropyl ammonium sulfate; 2,3-dihydroxypropyl methacrylate; amino alcohol acrylate; and amino alcohol methacrylate; alkyl designating a linear alkyl group comprising 1 to 6 carbon atoms;

and wherein the hydroalkyl monomer comprising at least one epoxide group is chosen from the group consisting of glycidyl acrylate; glycidyl methacrylate; and glycidyl allyl ether.

7. The polymer according to claim 1, wherein the polymer comprises an anionic monomer chosen from the group consisting of acrylic acid, methacrylic acid, itaconic acid, maleic acid and 2-acrylamido-2-methylpropane sulfonic acid (ATBS), said monomers being in acid form, partially salified or totally salified.

8. The polymer according to claim 1, wherein the polymer is obtained by inverse suspension polymerization and is in the form of a bead, the size of which is between 20 micrometers and 1000 micrometers.

9. The polymer according to claim 1, wherein the polymer is obtained by inverse emulsion polymerization and is in the form of a powder and has a particle size between 0.01 micrometers and 5 micrometers.

10. A method for preparing a water-soluble polymer in bead or powder form, wherein said polymer has a Brookfield viscosity greater than 100 cps, and is obtained by inverse suspension or inverse emulsion polymerization, in the presence of a transfer agent, of monomers comprising a $CH_2=C-$ function whereof less than 20 mol % is made up of at least one hydroalkyl monomer with formula $H_2C=CR^1R^2$, the 100 mol % addition being made up of non-ionic and/or anionic and/or cationic monomers different from said hydroalkyl monomer, $R^1$ being a hydrogen atom or a methyl group and $R^2$ being a hydrocarbon group containing at least one OH pendant group or at least one epoxide group and optionally at least one N or O heteroatom in the hydrocarbon chain; $R^2$ being different from the $C(=O)-OH$ group, said method comprising the following successive steps:

a) preparing an inverse suspension by mixing an aqueous phase comprising at least monomers and a transfer agent and a non-aqueous phase comprising at least one non-aqueous solvent and at least one surfactant;

the monomers comprising a $CH_2=C-$ function whereof less than 20 mol% is made up of at least one hydroalkyl monomer with formula $H_2C=CR^1 R^2$, the 100 mol % addition being made up of non-ionic and/or anionic and/or cationic monomers different from said hydroalkyl monomer, $R^1$ being a hydrogen atom or a methyl group and $R^2$ being a hydrocarbon group containing at least one OH pendant group or at least one epoxide group and optionally at least one N or O heteroatom in the hydrocarbon chain; $R^2$ being different from the $C(=O)-OH$ group;

b) inverse suspension polymerization of the monomers in the presence of a free radical initiator; and c) extracting water and solvent from the suspension in order to obtain, in bead form, the water-soluble hydroxyalkyl polymer with a Brookfield viscosity greater than 100 cps.

11. The method according to claim 10, wherein the step for extracting water and solvent comprises a step for eliminating water and solvent by azeotropic distillation, and a solid/liquid separating step.

12. The method according to claim 10, wherein the step for extracting water and solvent comprises a step for eliminating water and solvent by azeotropic distillation done at a pressure between 20 and 500 mbars.

13. A method for preparing a water-soluble polymer in bead or powder form,
wherein said polymer has a Brookfield viscosity greater than 100 cps, and is obtained by inverse suspension or inverse emulsion polymerization, in the presence of a transfer agent, of monomers comprising a $CH_2=C-$ function whereof less than 20 mol % is made up of at least one hydroalkyl monomer with formula $H_2C=CR^1R^2$, the 100 mol % addition being made up of non-ionic and/or anionic and/or cationic monomers different from said hydroalkyl monomer, $R^1$ being a hydrogen atom or a methyl group and $R^2$ being a hydrocarbon group containing at least one OH pendant group or at least one epoxide group and optionally at least one N or O heteroatom in the hydrocarbon chain; $R^2$ being different from the $C(=O)-OH$ group,
said method comprising the following successive steps:
a) preparing an inverse emulsion by mixing an aqueous phase comprising at least monomers and a transfer agent and a non-aqueous phase comprising at least one non-aqueous solvent and at least one emulsifying agent;
the monomers comprising a $CH_2=C-$ function whereof less than 20 mol % is made up of at least one hydroalkyl monomer with formula $H_2C=CR^1R^2$, the 100 mol % addition being made up of non-ionic and/or anionic and/or cationic monomers different from said hydroalkyl monomer,
$R^1$ being a hydrogen atom or a methyl group and $R^2$ being a hydrocarbon group containing at least one OH pendant group or at least one epoxide group and optionally at least one N or O heteroatom in the hydrocarbon chain; $R^2$ being different from the $C(=O)-OH$ group;
b) inverse emulsion polymerization of the monomers in the presence of a free radical initiator;
c) extracting water and solvent from the emulsion in order to obtain, in powder form, the water-soluble hydroxyalkyl polymer with a Brookfield viscosity greater than 100 cps.

14. The method according to claim 13, wherein the step for extracting water and solvent comprises a step for eliminating water and solvent by spray-drying.

15. The polymer according to claim 2, wherein the transfer agent is chosen from the group consisting of methanol, isopropanol, sodium hypophosphite, 2-mercaptoethanol, aminoethanethiol, cysteine, methallyl sulfonic acid, thioglycolic acid, thiolactic acid, glycolic acid, 3-mercaptopropionic acid, and the alkaline earth salts of these acids, and the mixtures of these compounds.

16. The polymer according to claim 2, wherein:
the polymer contains more than 8 mol % and less than 17 mol % of hydroxyalkyl monomer when the $R^2$ hydrocarbon group contains between 1 and 3 carbon atoms; and
the polymer contains more than 0.2 mol % and less than 5 mol % of hydroxyalkyl monomer when the $R^2$ hydrocarbon group contains more than 3 carbon atoms.

17. The polymer according to claim 16, wherein the hydroxyalkyl monomer comprising at least one OH pendant group is chosen from the group consisting of hydroxyalkyl acrylate; hydroxyalkyl methacrylate; hydroxyalkyl acrylamide; hydroxyalkyl methacrylamide; methacrylamido propyldimethyl-2,3-dihydroxypropyl ammonium sulfate; 2,3-dihydroxypropyl methacrylate; amino alcohol acrylate; and amino alcohol methacrylate; alkyl designating a linear alkyl group comprising 1 to 6 carbon atoms;
and wherein the hydroalkyl monomer comprising at least one epoxide group is chosen from the group consisting of glycidyl acrylate; glycidyl methacrylate; and glycidyl allyl ether.

18. The polymer according to claim 17, wherein the transfer agent is chosen from the group consisting of methanol, isopropanol, sodium hypophosphite, 2-mercaptoethanol, aminoethanethiol, cysteine, methallyl sulfonic acid, thioglycolic acid, thiolactic acid, glycolic acid, 3-mercaptopropionic acid, and the alkaline earth salts of these acids, and the mixtures of these compounds.

19. The polymer according to claim 18, wherein the polymer comprises an anionic monomer chosen from the group consisting of acrylic acid, methacrylic acid, itaconic acid, maleic acid and 2-acrylamido-2-methylpropane sulfonic acid (ATBS), said monomers being in acid form, partially salified or totally salified.

20. The polymer according to claim 6, wherein the polymer comprises an anionic monomer chosen from the group consisting of acrylic acid, methacrylic acid, itaconic acid, maleic acid and 2-acrylamido-2-methylpropane sulfonic acid (ATBS), said monomers being in acid form, partially salified or totally salified.

* * * * *